(12) United States Patent
Ramdas

(10) Patent No.: US 9,258,144 B2
(45) Date of Patent: Feb. 9, 2016

(54) METHODS, SYSTEMS AND COMPUTER-READABLE MEDIA FOR INTEGRATING A COMPOSITE MIME MESSAGE

(75) Inventor: Jayakrishnan Ramdas, Bangalore (IN)

(73) Assignee: Infosys Limited, Bangalore (IN)

( * ) Notice: Subject to any disclaimer, the term of this patent is extended or adjusted under 35 U.S.C. 154(b) by 700 days.

(21) Appl. No.: 13/528,986

(22) Filed: Jun. 21, 2012

(65) Prior Publication Data

US 2013/0227012 A1 Aug. 29, 2013

(30) Foreign Application Priority Data

Feb. 23, 2012 (IN) .............................. 670/CHE/2012

(51) Int. Cl.
*G06F 15/16* (2006.01)
*H04L 12/58* (2006.01)

(52) U.S. Cl.
CPC ............ *H04L 12/584* (2013.01); *H04L 51/063* (2013.01)

(58) Field of Classification Search
CPC .............................. H04L 12/584; H04L 51/063
See application file for complete search history.

(56) References Cited

U.S. PATENT DOCUMENTS

| | | | |
|---|---|---|---|
| 6,662,357 B1 | 12/2003 | Bowman-Amuah | |
| 7,080,092 B2 | 7/2006 | Upton | |
| 7,421,709 B2 | 9/2008 | Watson et al. | |
| 7,720,809 B2 | 5/2010 | Knudsen et al. | |
| 8,751,447 B2 * | 6/2014 | Vasudevan et al. | 707/626 |
| 2003/0172368 A1 | 9/2003 | Alumbaugh et al. | |
| 2005/0223392 A1 | 10/2005 | Cox et al. | |
| 2007/0260619 A1 | 11/2007 | Whelan et al. | |
| 2007/0282866 A1 * | 12/2007 | Knudsen et al. | 707/100 |
| 2008/0091448 A1 | 4/2008 | Niheu et al. | |
| 2008/0317068 A1 * | 12/2008 | Sagar et al. | 370/503 |
| 2009/0060196 A1 * | 3/2009 | Fujiwara et al. | 380/277 |
| 2009/0100010 A1 | 4/2009 | Dargahi et al. | |
| 2010/0035660 A1 * | 2/2010 | Liao | 455/566 |
| 2010/0131572 A1 | 5/2010 | Tulkoff et al. | |
| 2010/0138446 A1 * | 6/2010 | Canessa et al. | 707/770 |
| 2010/0325223 A1 | 12/2010 | Christensen et al. | |
| 2012/0191804 A1 * | 7/2012 | Wright et al. | 709/217 |
| 2013/0124647 A1 * | 5/2013 | Odenheimer et al. | 709/206 |

* cited by examiner

*Primary Examiner* — Brian J Gillis
*Assistant Examiner* — Michael A Keller
(74) *Attorney, Agent, or Firm* — LeClairRyan, a Professional Corporation

(57) ABSTRACT

The present invention provides a method and system for integrating a composite message such as a Multipurpose Internet Mail Extensions (MIME) message. A metadata template associated with a metadata XML object is extracted from a content management system, whereby a key of the metadata XML object is passed with the request for communicating the composite message. One or more content assemblers are configured to retrieve one or more static content from one or more content management systems and one or more document management systems, in an iterative manner, based on the metadata template. A child content assembler is further configured to extract the dynamic content required for merging with the retrieved static content, to generate one or more message parts. A message generator is configured to concatenate the one or more message parts in a sequence for generating the composite message.

45 Claims, 3 Drawing Sheets

METHODS, SYSTEMS AND COMPUTER-READABLE MEDIA FOR INTEGRATING A COMPOSITE MIME MESSAGE

This application claims the benefit of Indian Patent Application Filing No. 670/CHE/2012, filed Feb. 23, 2012, which is hereby incorporated by reference in its entirety.

BACKGROUND

Currently various content management systems, document management systems, output channel systems, and workflow management tools are being employed in business enterprises for providing different output channels and archival system capabilities. The output channels are required for sending communications to customers of such business enterprises. In order to meet the ever-growing needs of the customers in terms of newer output channel features such as workflows and pre and post processing and newer output formats such as mime messages, calendar invites, tasks, efax and appointments, the architecture of the various content management systems, document management systems, output channel systems, and workflow management tools undergo considerable changes. As a result, in an instance a large business enterprise may have multiple content management systems and document management systems, each having a lot of custom code, to integrate. In contrast a smaller business enterprise may have to revamp existing content management systems due to architectural change.

Further, each content management system, document management system, output channel system, and workflow management tool provides its own proprietary API. In order for such proprietary API to match the customers' needs completely customization is required. Traditionally, each customer may customize the content management system or the document management system in a tightly coupled manner, thereby leading to limitations in integrating the various content management systems that differ in architecture. For instance, combining disparate contents from the various content management systems to generate a Multipurpose Internet Mail Extensions (MIME) message such as email, calendar and efax, is a hindrance when the content management systems are customized in the tightly coupled manner. Hence there is a need for a system and method that can integrate the different content management systems, document management systems, output channel systems and workflow management tools in order to dynamically generate the mime message of any form. The method and system must enable extending the existing capabilities of the Content Management Systems, the document management systems and the output channel systems in a generic manner such that the underlying system can be easily replaced.

SUMMARY

The present invention alleviates the above mentioned drawbacks of the existing prior art by providing a method and system for integrating various content management systems, document management systems, output channel systems, and workflow management tools and extending their existing capabilities in a generic manner in order to generate a mime message in any form. To achieve the aforementioned objective the instant invention provides a method and system for integrating a composite message such as a Multipurpose Internet Mail Extensions (MIME) message. In accordance with a disclosed embodiment, the method may include receiving a request to communicate the composite message, extracting a key of a metadata XML object and a set of dynamic content from the request, reading an identifier of a content management system that stores the metadata XML object, retrieving a metadata template associated with the metadata XML object from one or more content management systems, retrieving one or more static content from the one or more content management systems or one or more document management systems, iteratively based on the metadata template, retrieving the set of dynamic content from a repository, merging the set of dynamic content with the one or more static content to generate one or more message parts, and generating the composite message by concatenating the one or more message parts in a sequence.

The instant invention also provides a system for integrating a composite message such as a Multipurpose Internet Mail Extensions (MIME) message. The system comprises a processor module, configured to extract a key of a metadata XML object and one or more keys of a set of dynamic content, from a request to communicate the composite message, the request being received from a networked system. One or more content assemblers are configured to retrieve a metadata template from one of a one or more content management systems, whereby the metadata template is associated with the metadata XML object and one or more static content from one of one or more content management systems and one or more document management systems, iteratively based on the metadata template. A child content assembler of one of the one or more content assembler is configured to; retrieve the set of dynamic content from a repository; merge the set of dynamic content with the one or more static content; and generate one or more message parts. The one or more message parts are then concatenated by a message generator in a sequence to generate the composite message.

The instant invention also provides a computer program product for integrating a composite message such as a Multipurpose Internet Mail Extensions (MIME) message, the computer program product consists of a plurality of program instructions that are stored on a tangible computer readable media which when run on a computer processor carry out the steps for integrating the composite message. The steps of integrating the composite message include receiving a request to communicate the composite message, extracting a key of a metadata XML object and a set of dynamic content from the request, reading an identifier of a content management system that stores the metadata XML object, retrieving a metadata template associated with the metadata XML object from one or more content management systems, retrieving one or more static content from the one or more content management systems or one or more document management systems, iteratively based on the metadata template, retrieving the set of dynamic content from a repository, merging the set of dynamic content with the one or more static content to generate one or more message parts, and generating the composite message by concatenating the one or more message parts in a sequence.

These and other features, aspects, and advantages of the present invention will become better understood with reference to the following description and claims.

BRIEF DESCRIPTION OF THE DRAWINGS

The drawings represent one or more implementations of the present invention, by way of example only, not by way of limitation. In the drawings like reference numerals refer to same or similar elements.

DETAILED DESCRIPTION

Figure 1:
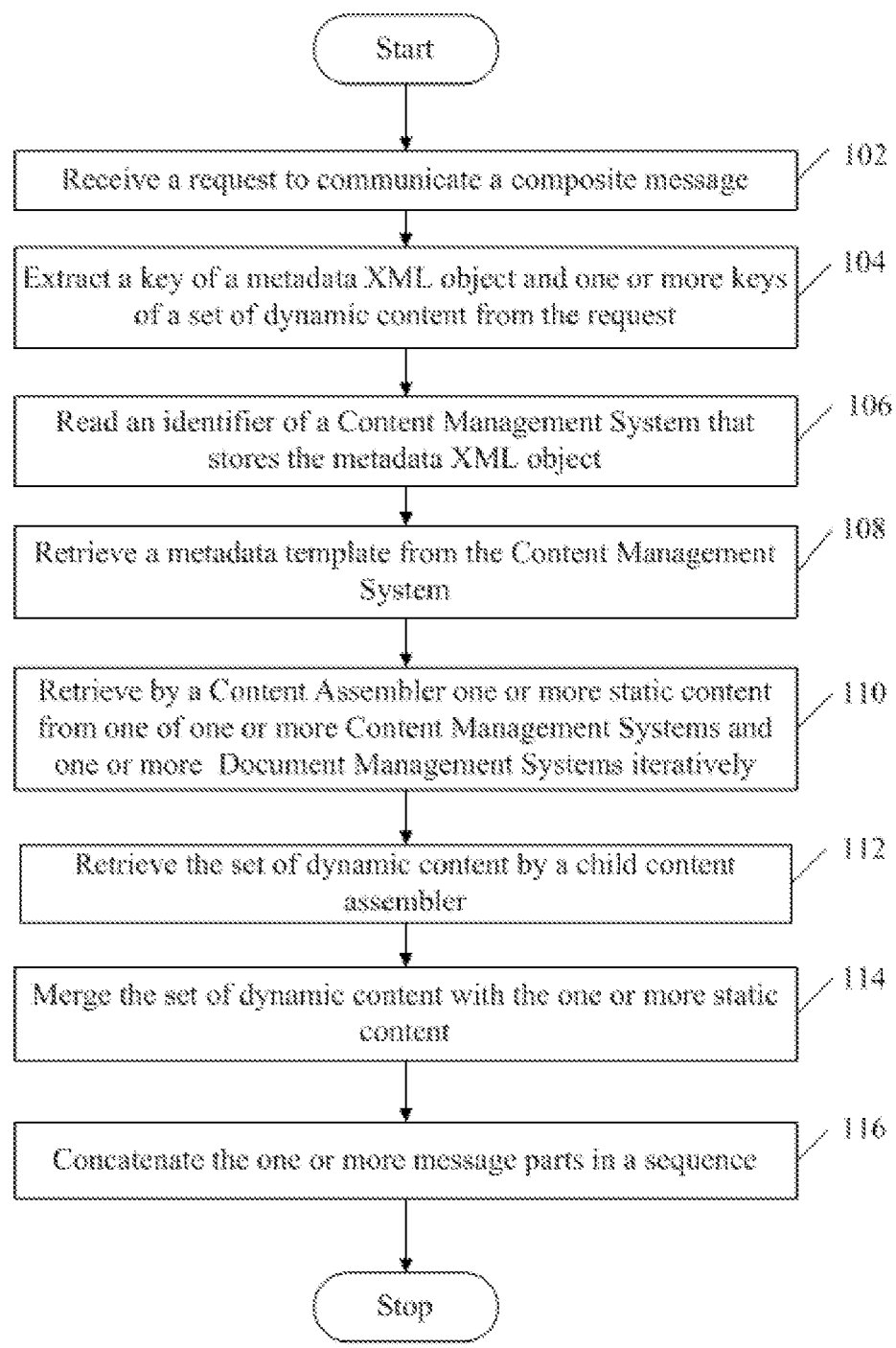
FIG. 1 is a flowchart illustrating a preferred embodiment of a method of integrating a composite message.

Disclosed embodiments provide computer-implemented methods, systems, and computer-program products for integrating a plurality of information systems such as content management systems, document management systems, output channel systems, and workflow management tools and extending their existing capabilities in a generic manner in order to generate a mime message in any form. The methods disclosed herein, incorporate a metadata XML template to be utilized for extracting existing static content and dynamic content required for generating the MIME message. The metadata XML template includes one or more keys for each of the static content and dynamic content that indicates the information system from where the static content and dynamic content is to be extracted in what order and concatenated in which manner to generate the MIME message FIG. 1 is a flowchart that illustrates a method performed in integrating a composite message from the plurality of information systems in accordance with an embodiment of the present invention.

At step 102, a request to communicate the composite message is received by a processor module from any networked system or a user. In an embodiment, the request can include one or more keys of a set of dynamic content to be included within the composite message and a key of a metadata XML object. At step 104, a key of a metadata XML object is extracted by the processor module, along with one or more keys of a set of dynamic content, that are passed within the request. The metadata XML object basically contains an identifier of a Content Management System (CMS) that stores a metadata template. The identifier of the CMS is read by the processor module from a property file that stores the metadata XML object, at step 106. The retrieved identifier of the CMS is passed by the processor module to one of one or more content assemblers in order to retrieve the metadata template. At step 108, the content assembler retrieved the metadata template from the CMS. The metadata template can include one or more keys of one or more static content required for generating the composite message. In an embodiment, the one or more keys can include one or more identifiers of the one or more CMS that store the one or more static content. At step 110, the one or more content assemblers to which the one or more keys of the one or more static content are passed, can retrieve the one or more static content from the one or more CMS. At step 112, one or more child content assemblers of the one or more content assemblers, that are created based on an inheritance policy, retrieve the set of dynamic content, from a repository based on the one or more keys of the dynamic content that were passed with the request. At step 114, the one or more child content assemblers merge the set of dynamic content with the retrieved one or more static content, individually to generate separate one or more message parts. The generated one or more message parts are passed by the processor module to a MIME message generator, that concatenates the one or more message parts to generate the composite message at step 116. The generated one or more message parts are concatenated on the basis of a sequential identifier, that is read from the metadata template, retrieved at step 108. The generated composite message is further communicated to an output channel adapter to transform the generated composite message into an output format as specified by an output format identifier present in the metadata template. Instances of the output format include, email, efax, calendar invites, appointment, and other types of messages. The generated composite message is further sent to a DMS adapter for archival in the one or more DMS. Further, the metadata template includes a part type identifier for each of the one or more static contents, which indicates whether a static content is a 'Multipart' or a 'Single Part'. In an embodiment, a 'Multipart' static content can be retrieved from a DMS, whereas a 'SinglePart' static content can be retrieved from a CMS or a DMS. Further, a content type identifier of the metadata template indicates whether the generated composite message is preferably a 'Multipart' or a 'SinglePart' type of message. In an instance where, the content type identifier, equals 'Multipart', the retrieved static content is segregated and stored into one or the one or more message parts, as a 'Multipart' composite message usually has dynamic content to be embedded.

Figure 2:
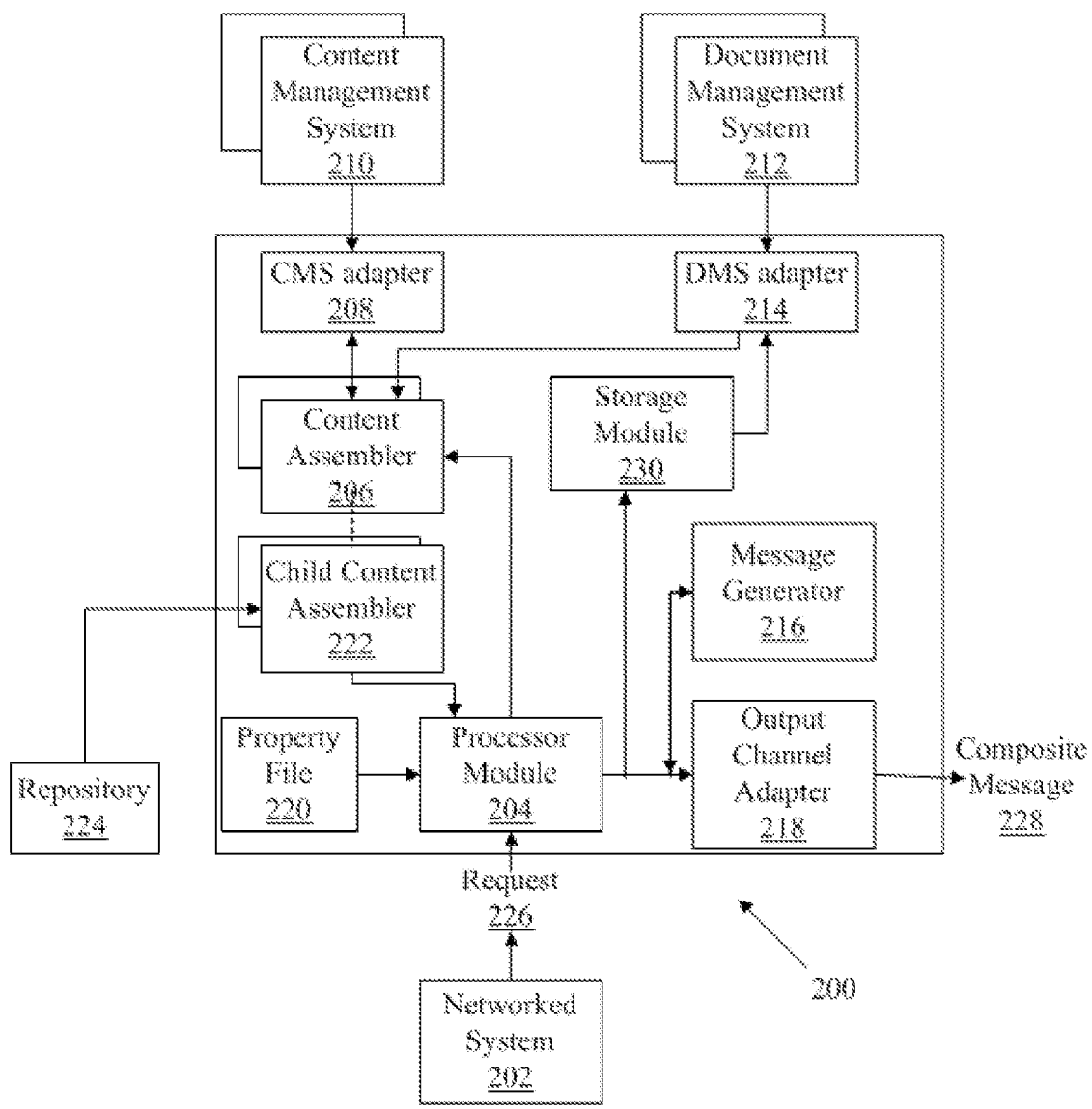
FIG. 2 is a system illustrating a preferred embodiment of a system for integrating a composite message.

FIG. 2 illustrates an exemplary system 200 in which various embodiments of the invention can be practiced. The exemplary system includes a networked system 202, a processor module 204, one or more content assemblers 206, one or more child content assemblers 222, a storage module 230, a message generator 216, an output channel adapter 218, one or more Content Management System (CMS) adapters 208, one or more Document Management System (DMS) adapters 214, one or more Content Management Systems (CMS) 210, one or more Document Management Systems (DMS) 212, a property file 220 and a repository 224.

In an embodiment the processor module 204 is configured to receive a request 226 to communicate a composite message 228 from a networked system 202. The networked system 202 could be any client network initiating the request 226 to send a composite message such as a MIME message including an Email, calendar invites, efax, tasks, appointments and the like. The request 226 can be in the form of an XML file, http request, a web service or a flat file. The request 226 can include one or more keys of a set of dynamic content required to be included in the MIME message and a key of a metadata XML object. The one or more keys of the dynamic content can include a file name, path name of a folder structure and a data source of the dynamic content, from where the dynamic content can be fetched. The data source of the dynamic content can be a repository 224 such as a Comma Separated Values (CSV) file, an XML file, or a database. The key of the metadata XML object can include an identifier of a content management system (CMS) 210 that stores a metadata template or a metadata file. The identifier of the CMS 210 that stores the metadata template is read by the processor module 204 from a property file 120. In an embodiment the CMS 210 can be a Metadata Store that stores a set of metadata templates. The identifier of the CMS 210 is communicated by the processor module 204 to a content assembler 206. The content assembler 206 then retrieves the metadata template stores in the CMS 210. The metadata template can contain one or more keys of one or more static content required for generating the MIME message. The one or more keys of the one or more static content can include the path name of the Folder structure of the one or more static content, in an embodiment where the one or more static content is stored in a data server. In an alternate embodiment the one or more keys of the one or more static content can include one or more identifiers of the one or more CMS 210 or one or more identifiers of the one or more DMS 212 that store the one or more static content. In the alternate embodiment the one or more keys can further include the one or more identifiers of the one or more static content in each of the one or more CMS 210. The content assembler 206 then retrieves the one or more static content based on the one or more keys as retrieved from the metadata template, in an iterative manner. The one or more keys are communicated to the content assembler 206 by the processor module 204. For instance for a first key of a first static content the content assembler 206 may retrieve the first static content, and then invoke a child content assembler 222, on the basis of an inheritance policy, to retrieve a first dynamic content of the set of dynamic content, from the repository 224, where the first dynamic content is preferably dynamic data that needs to be incorporated in the first static content. The retrieved first dynamic content is merged with the first static content to generate a message part. Similarly, for a second key of a second static content, the content assembler 206 may retrieve the second static content, and then invoke the child content assembler 222 to retrieve a second dynamic content from the set of dynamic content, and so on. Each of the generated message parts are stored in a storage module 230. The metadata template can further include a sequential identifier that indicates the sequence in which the one or more message parts is to be merged while generating the composite message. A MIME message generator 216 can concatenate the generated one or more message parts, based on the sequential identifier, to generate the composite message. The processor module 204 can call an output channel adapter 218 for communicating the generated output message into an output channel.

The metadata template can further include a part type identifier which indicates a type of each of the one or more static content, an output format identifier that indicates an output format in which the composite message is required to be generated by the MIME message generator 216. Instances of the output format can include email, calendar, efax, appointment, message, and calendar invites. The output channel adapter 218 can be programmed to transform the generated composite message into the output format as desired. The output format shall correspond to the output channel via which the generated composite message shall be communicated. In the disclosed embodiment the metadata template can include a content type identifier indicating whether the generated composite message is a 'Multipart' message or a 'SinglePart' Message. In an instance where the content type identifier equals 'Multipart' the static content that is retrieved from one or the one or more CMS 210 is segregated and stored in a separate message part. In an instance where the content type identifier equals 'SinglePart' the static content is stored within a single message part. A CMS adapter 208 can take care of communication protocols required for communication with each of the one or more CMS 210. Each CMS of the one or more CMS 210 can have a CMS adapter 208 as an interface for communication. Instances of communication protocols can include, asynchronous messaging, java messaging services, http and the like. Similarly a DMS adapter 214 can take care of communication protocols required for communication with each of the one or more DMS 212. The DMS adapter 214 can be called by the processor module 204 for archiving generated composite message into an associated DMS of the one or more DMS 212.

One or more of the above-described techniques can be implemented in or involve one or more computer systems. FIG. 4 illustrates a generalized example of a computing environment 400. The computing environment 400 is not intended to suggest any limitation as to scope of use or functionality of described embodiments.

Figure 3:
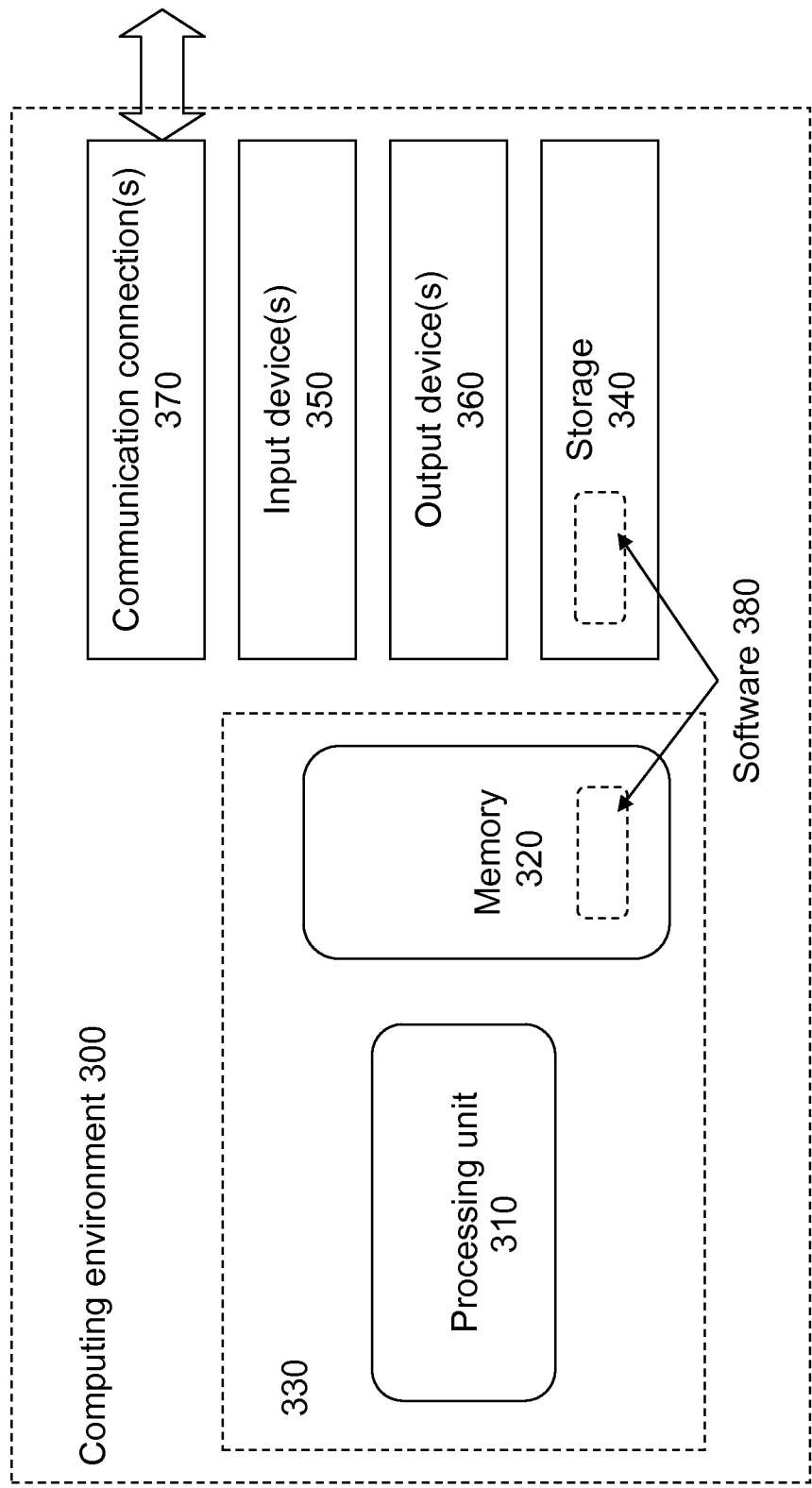
FIG. 3 illustrates a generalized example of a computing environment 300.

With reference to FIG. 3, the computing environment 300 includes at least one processing unit 310 and memory 320. In FIG. 3, this most basic configuration 330 is included within a dashed line. The processing unit 310 executes computer-executable instructions and may be a real or a virtual processor. In a multi-processing system, multiple processing units execute computer-executable instructions to increase processing power. The memory 320 may be volatile memory (e.g., registers, cache, RAM), non-volatile memory (e.g., ROM, EEPROM, flash memory, etc.), or some combination of the two. In some embodiments, the memory 320 stores software 380 implementing described techniques.

A computing environment may have additional features. For example, the computing environment 300 includes storage 340, one or more input devices 340, one or more output devices 360, and one or more communication connections 370. An interconnection mechanism (not shown) such as a bus, controller, or network interconnects the components of the computing environment 300. Typically, operating system software (not shown) provides an operating environment for other software executing in the computing environment 300, and coordinates activities of the components of the computing environment 300.

The storage 340 may be removable or non-removable, and includes magnetic disks, magnetic tapes or cassettes, CD-ROMs, CD-RWs, DVDs, or any other medium which can be used to store information and which can be accessed within the computing environment 300. In some embodiments, the storage 340 stores instructions for the software 380.

The input device(s) 350 may be a touch input device such as a keyboard, mouse, pen, trackball, touch screen, a voice input device, a scanning device, a digital camera, or another device that provides input to the computing environment 300. The output device(s) 360 may be a display, printer, speaker, or another device that provides output from the computing environment 300.

The communication connection(s) 370 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 300, computer-readable media include memory 320, storage 340, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A method for integrating a composite message, the method comprising:
   receiving, by a message management computing device, a request to communicate a composite message comprising one or more dynamic content keys and a metadata Extensible Markup Language (XML) object comprising a metadata XML object key;
   extracting, by the message management computing device, the metadata XML object key and the one or more dynamic content keys from the request;
   retrieving, by the message management computing device, a metadata template associated with the metadata XML object, from a content management system, wherein the retrieved metadata template comprises a sequential identifier indicating a merge sequence for one or more message parts and a static content key comprising an address of static content and an identifier of at least one of the content management system or a document management system in which the static content is stored;
   retrieving, by the message management computing device, dynamic content from a repository and the static content from the at least one of the content management system or the document management system, based on the retrieved metadata template;
   generating, by the message management computing device, the one or more message parts based on the dynamic content and the static content;
   generating, by the message management computing device, a composite message by concatenating the one or more message parts in a sequence based on the sequential identifier indicating the merge sequence for the one or more message parts.

2. The method of claim 1, further comprising:
   storing, by the message management computing device, the generated composite message in the document management system;
   sending, by the message management computing device, the generated composite message to an output channel adapter;
   transforming, by the message management computing device, the generated composite message into an output format corresponding to an output channel; and
   communicating, by the message management computing device, the transformed message in an output format corresponding to the output channel.

3. The method of claim 2, wherein the metadata template comprises:
   a key,
   a content type identifier,
   a part type identifier, for the static content, or
   an output format identifier.

4. The method of claim 3, further comprising:
   communicating, by the message management computing device, the static content key to a content assembler associated with the at least one of the content management system or the document management system.

5. The method of claim 4, wherein the retrieving the static content, further comprises:
   communicating, by the message management computing device, the static content key to the associated content assembler.

6. The method of claim 5, wherein the static content key is utilized by the associated content assembler to retrieve the static content from the at least one of the content management system or the document management system.

7. The method of claim 3, wherein:
   the sequential identifier indicates the sequence in which the static content occurs in the metadata template,
   the part type identifier indicates a type of one of the static content,
   the output format identifier indicates the output format in which the composite message is generated, or
   the content type identifier comprises a multipart identifier or a singlepart identifier.

8. The method of claim 7, further comprising:
   storing, by the message management computing device, the retrieved static content in one of the one or more message parts when the content type identifier indicates a multipart identifier.

9. The method of claim 7, wherein the output format comprises an email, a calendar, an efax, an appointment, a message invitation, or a calendar invitation.

10. The method of claim 1, wherein the metadata XML object comprises an identifier for the content management system.

11. The method of claim 1, further comprising:
   creating, by the message management computing device, a child content assembler of the content assembler based on an inheritance policy.

12. The method of claim 1, further comprising:
   generating, by the message management computing device, a Multipurpose Internet Mail Exchange (MIME) message based on the one or more message parts.

13. The method of claim 1, wherein the repository is comprises a file server, a database server, a CSV file or an XML file.

14. The method of claim 1, wherein content management system identifier comprising the metadata XML object is stored in a property file.

15. The method of claim 1, wherein the retrieving the dynamic content is based on the one or more dynamic content keys.

16. A message management computing device comprising:
a processor;
a memory coupled to the processor which is configured to be capable of executing programmed instructions, which comprise the programmed instructions stored in the memory to:
receive a request to communicate a composite message comprising one or more dynamic content keys and a metadata Extensible Markup Language (XML) object comprising a metadata XML object key;
extract the metadata XML object key and the one or more dynamic content keys from the request;
retrieve a metadata template from associated with the metadata XML object, from a content management system, wherein the retrieved metadata template comprises a sequential identifier indicating a merge sequence for one or more message parts and a static content key comprising an address of static content and an identifier of at least one of the content management system or a document management system in which the static content is stored;
retrieve dynamic content from a repository and static content from the at least one of the content management system and document management system, based on the retrieved metadata template;
generate the one or more message parts based on the dynamic content and the static content; and
generate a composite message by concatenating the one or more message parts in a sequence based on the sequential identifier indicating the merge sequence for the one or more message parts.

17. The device of claim 16, wherein the processor is further configured to be capable of executing programmed instructions, which comprise the programmed instructions stored in the memory to:
store the generated composite message in the document management system; and
send the generated composite message to an output channel adapter;
transform the generated composite message into an output format corresponding to an output channel; and
communicate the transformed message in an output format corresponding to the output channel.

18. The system of claim 17, wherein the metadata template comprises:
a key,
a content type identifier,
a part type identifier, for the static content, or
an output format identifier.

19. The device of claim 18, wherein the processor is further configured to be capable of executing programmed instructions, which comprise the programmed instructions stored in the memory to:
communicate the static content key to a content assembler associated with the at least one of the content management system or the document management system.

20. The device of claim 19, wherein the processor is further configured to be capable of executing programmed instructions for the retrieving the static content, which comprise the programmed instructions for the retrieving the static content stored in the memory to:
communicate the static content to the associated content assembler.

21. The device of claim 20, wherein the static content key is utilized by the associated content assembler to retrieve the static content from the at least one of the content management system or the document management system.

22. The device of claim 18, wherein:
the sequential identifier indicates the sequence in which the static content occurs in the metadata template,
the part type identifier indicates a type of one of the static content,
the output format identifier indicates an output format in which the composite message is generated, or
the content type identifier comprises a multipart identifier or a singlepart identifier.

23. The device of claim 22, wherein the processor is further configured to be capable of executing programmed instructions, which comprise the programmed instructions stored in the memory to:
store the retrieved static content in one of the one or more message parts when the content type identifier indicates a multipart identifier.

24. The device of claim 22, wherein the output format comprises an email, a calendar, an efax, an appointment, a message invitation, or a calendar invitation.

25. The device of claim 16, wherein the metadata XML object comprises an identifier for the content management system.

26. The device of claim 16, wherein the processor is further configured to be capable of executing programmed instructions, which comprise the programmed instructions stored in the memory to:
create a child content assembler of the content assembler based on an inheritance policy.

27. The device of claim 16, wherein the processor is further configured to be capable of executing programmed instructions, which comprise the programmed instructions stored in the memory to:
generate a Multipurpose Internet Mail Exchange (MIME) message based on the one or more message parts.

28. The device of claim 16, wherein the repository comprises a file server, a database server, a CSV file, or an XML file.

29. The device of claim 16, wherein the content management system identifier comprising the metadata XML object is stored in a property file.

30. The device of claim 16, wherein the retrieving the dynamic content is based on the one or more dynamic content keys.

31. A non-transitory computer-readable medium having stored thereon instructions for integrating a composite message, comprising machine executable code which when executed by at least one processor, causes the processor to perform steps comprising:
receiving, from a networked system, a request to communicate a composite message comprising one or more dynamic content keys and a metadata Extensible Markup Language (XML) object comprising a metadata XML object key;
extracting the metadata XML object key and one or more dynamic content keys from the request;
retrieving a metadata template associated with the metadata XML object, from a content management system, wherein the retrieved metadata template comprises a sequential identifier indicating a merge sequence for one or more message parts and a static content key comprising an address of static content and an identifier of at least one of the content management system or a document management system in which the static content is stored;

retrieving dynamic content from a repository and static content from the at least one of the content management system or the document management system, based on the retrieved metadata template;

the one or more message parts based on the dynamic content and the static content;

generating a composite message by concatenating the one or more message parts in a sequence based on the sequential identifier indicating the merge sequence for the one or more message parts.

32. The medium of claim 31, further having stored thereon instructions that when executed by the processor cause the processor to perform steps further comprising:

storing the generated composite message in the document management system;

sending the generated composite message to an output channel adapter;

transforming the generated composite message into an output format corresponding to an output channel; and communicating the transformed message in an output format corresponding to the output channel.

33. The medium of claim 32, wherein the metadata template comprises:

a key, a content type identifier, a part type identifier, for the static content, or an output format identifier.

34. The medium of claim 33, further having stored thereon instructions that when executed by the processor cause the processor to perform steps further comprising:

communicating the static key to a content assembler associated with the at least one of the content management system or the document management system.

35. The medium of claim 34, further having stored thereon instructions for the retrieving the static content that when executed by the processor causes the processor to perform steps further comprising:

communicating the static content key to the associated content assembler.

36. The medium of claim 35, wherein the static content key is utilized by the associated content assembler to retrieve the static content from the at least one of the content management system or the document management system.

37. The medium of claim 33, wherein: the sequential identifier indicates the sequence in which the static content occurs in the metadata template, the part type identifier indicates a type of one of the static content, the output format identifier indicates the output format in which the composite message is generated, or the content type identifier comprises a multipart identifier or a singlepart identifier.

38. The medium of claim 37, further having stored thereon instructions that when executed by the processor cause the processor to perform steps further comprising:

storing the retrieved static content in one of the one or more message parts when the content type identifier indicates a multipart identifier.

39. The medium of claim 37, wherein the output format comprises an email, a calendar, an efax, an appointment, a message invitation or a calendar invitation.

40. The medium of claim 31, wherein the metadata XML object comprises the identifier for the content management system.

41. The medium of claim 31, further having stored thereon instructions for the retrieving the static content that when executed by the processor causes the processor to perform steps further comprising:

creating a child content assembler of the content assembler based on an inheritance policy.

42. The medium of claim 31, further having stored thereon instructions that when executed by the processor cause the processor to perform steps further comprising:

generate a Multipurpose Internet Mail Exchange (MIME) message based on the one or more message parts.

43. The medium of claim 31, wherein the repository comprises a file server, a database server, a CSV file or an XML file.

44. The medium of claim 31, wherein a content management system identifier comprising the metadata XML object is stored in a property file.

45. The medium of claim 31, wherein the retrieving the dynamic content is based on the one or more dynamic content keys.

* * * * *